United States Patent [19]

De Gruijter

[11] Patent Number: 4,906,027
[45] Date of Patent: Mar. 6, 1990

[54] INSULATING JOINT FOR METAL PIPELINES

[75] Inventor: Wilhelmus A. E. M. De Gruijter, Zwijndrecht, Belgium

[73] Assignee: Angli Holding B.V., Rotterdam, Netherlands

[21] Appl. No.: 309,803

[22] Filed: Feb. 10, 1989

[30] Foreign Application Priority Data

Feb. 12, 1988 [IT] Italy ............................. 19385 A/88

[51] Int. Cl.⁴ ............................................. F16L 59/14
[52] U.S. Cl. ........................................ 285/51; 285/263; 174/85
[58] Field of Search ..................... 285/51, 50, 48, 54, 285/53, 52, 263, 261; 174/85, 86

[56] References Cited

U.S. PATENT DOCUMENTS

| | | | |
|---|---|---|---|
| 68,112 | 8/1867 | Rhodes | 285/261 |
| 488,946 | 12/1892 | O'Neill | 285/51 |
| 554,394 | 2/1896 | McCarthy | 285/50 |
| 897,700 | 9/1908 | Ashbaugh | 285/50 |
| 922,313 | 5/1909 | McCarthy | 285/50 X |
| 997,087 | 7/1911 | Peeples | 285/54 X |
| 2,067,768 | 1/1937 | Krefft | 285/263 |
| 2,332,893 | 10/1943 | Clickner | 285/261 |
| 3,038,743 | 6/1962 | Zaloumis | 285/51 |
| 3,441,293 | 4/1969 | Bagnulo | 285/50 |
| 3,612,578 | 10/1971 | Bagnulo | 285/50 |
| 4,174,124 | 11/1979 | Dockree | 285/54 |

FOREIGN PATENT DOCUMENTS

| | | | |
|---|---|---|---|
| 709337 | 8/1931 | France | 285/51 |
| 1244446 | 9/1960 | France | 285/261 |
| 718350 | 11/1954 | United Kingdom | 285/54 |
| 842233 | 7/1960 | United Kingdom | 285/48 |

Primary Examiner—Thomas F. Callaghan
Attorney, Agent, or Firm—Michael J. Striker

[57] ABSTRACT

An insulating joint for pipelines comprises two metal tubular parts each having a dilated end portion, the dilated portion of one of the tubular parts being located within the dilated portion of the other tubular part and the dilated portions extending substantially parallel to each other so as to form a gap therebetween, two sleeves composed of an insulating material and forcefully introduced into the gap one after the other in a longitudinal direction so as to form a space therebetween, and a gasket located in the space and forcefully compressed between the two sleeves.

14 Claims, 1 Drawing Sheet

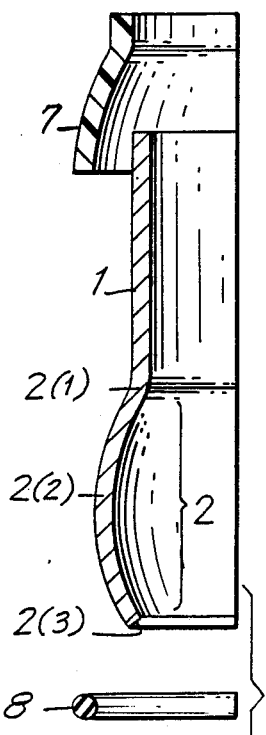
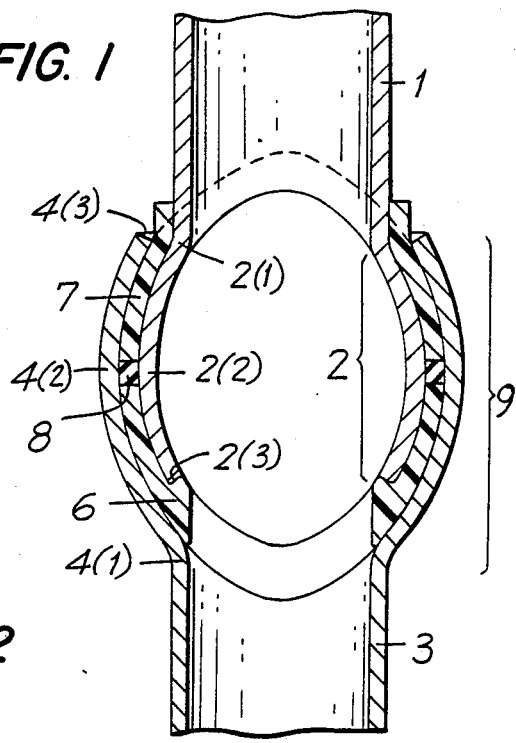
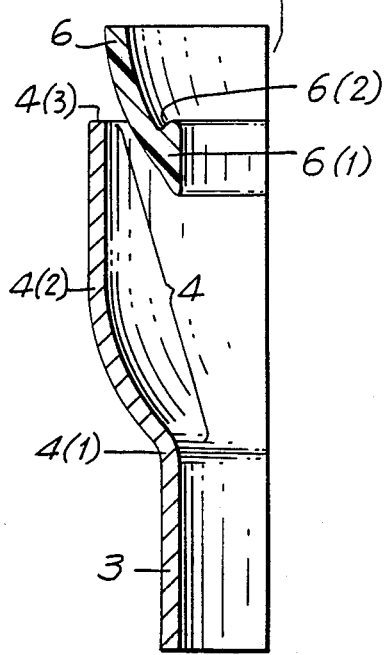
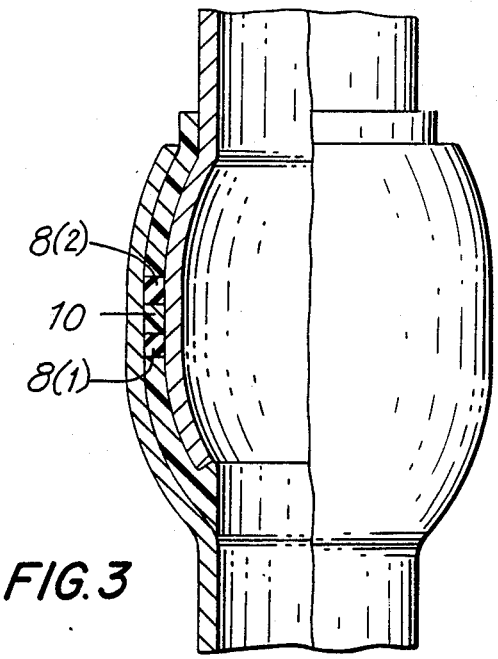
FIG. 1
FIG. 2
FIG. 3

INSULATING JOINT FOR METAL PIPELINES

BACKGROUND OF THE INVENTION

The present invention relates to an insulating joint for metal pipepines.

Insulating joints for metal pipelines are universally known. The joints serve the purpose of interrupting the electric continuity in a pipeline by interrupting the continuity of the metal. When the insulating joints are to be used on small diameter pipelines involved in conveying fluids towards several points for their use conventionally referred to as consumers, the pipelines have to withstand low pressure and are subjected to limited mechanical stress. The tendency here is to procure the most economical insulating joints. The insulating joint is essentially a special tubular piece composed of two tubular metal parts which are mechanically and soundly connected with one another but reciprocally and electrically isolated from each other through the interposition of dielectrical and sealing parts. The construction of such insulating joints and the work involved are far from being simple, since the joint has to possess mechanical and electrical characteristics such as to endow it with elevated working reliability. The overstressed general tendency of procuring low cost insulating joints has forcefully induced the market to present poor-quality joints with a consequential lack in reliability.

SUMMARY OF THE INVENTION

Accordingly, it is an object of the present invention to provide an insulating joint for metal pipelines which avoids the disadvantages of the prior art.

More particularly, it is an object of the present invention to provide an insulating joint for metal pipelines which satisfies the requirements for the joint of acceptable reliability with low manufacturing costs.

In keeping with these objects and with others which will become apparent hereinafter, one feature of the present invention resides, briefly stated, in an insulating joint for metal pipelines which includes two tubular metal parts having dilated end portions and arranged so that the dilated end portion of one metal part is inserted into the dilated end portion of the other metal part, the dilated end portions extend parallel to one another with a gap therebetween, two sleeves composed of a rigid and slightly resilient insulating material forcefully introduced in said gap, and an 0-ring compressed between opposing extreme edges of the sleeves.

When the insulating joint for metal pipelines is designed in accordance with the present invention, it has a required reliability and at the same time low manufacturing costs.

The dilated end portions of the metal tubular parts may have an elliptical cross-section. They may be formed so that the end portion of one of the tubular parts is located in the end portion of the other of the tubular parts, and the dilated end portions cannot dislodge relative to one another. The gap between the dilated end portions of the metal tubular parts may be equal to substantially a few millimeters.

The sleeves may be composed of a rigid and at the same time slightly resilient insulating material. They may have substantially the same length.

The gasket located between the two sleeves may be formed as an O-ring. The gasket may be composed of an elastomeric material.

At least one of the insulating sleeves may be glued to the respective one of the dilated end portions of the tubular parts. Of course, both insulating sleeves may be glued respectively to the dilated end portions of the tubular parts.

The end portions of the metal parts have metal surfaces which are in contact with the insulating sleeves, and at least some of the metal surfaces may be sand blasted, or lined with insulating paint.

The two tubular parts may be strongly compressed in a longitudinal direction and in a transverse direction against the two insulating sleeves. The metal tubular parts have end sections arranged to be connected with pipelines to be isolated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a cross-section of an insulating joint of metal pipelines in accordance with the present invention;

FIG. 2 is a view showing various components of the inventive insulating joint before their assembling and blocking; and FIG. 3 is a view showing the insulating joint for metal in accordance with another embodiment of the present invention.

DESCRIPTION OF THE PREFERRED EMBODIMENTS

A prefabricated monolithic insulating joint for connecting metal pipelines includes a first metal tubular part which is identified with reference numeral 1 and has an end portion 2. The end portion 2 is progressively dilated from a point 2 (1) where the external diameter of the end portion 2 equals to the external diameter of the pipe, to the point 2 (2) where the external diameter of the end portion 2 is greater by a few millimeters than the external in the point 2 (1) for a predetermined stretch. From the point 2 (2) the diameter of the end portion 2 starts shrinking progressively for more or less a similar stretch as above, until it reaches a point 2 (3) in which it has approximately the same external diameter as in the point 2 (1).

The insulating joint further includes an another metal tubular part 3 which has an end portion 4. The end portion 4 progressively dilates for a predetermined stretch from a point 4 (1) where it has the internal diameter equal to the internal diameter of the tubular part 3, until reaching a point 4 (2). The internal surface of this first stretch of the end portion 4 is formed so that when the insulating joint in accordance with the present invention has been assembled, it runs parallel to the external surface of the second stretch of the end portion 2 of the tubular part 1 so as to form a spacing or gap of a few millimeters between the opposite surfaces of the end portions of the tubular parts 1 and 3. From the point 4 (2), the end portion 4 extends over another predetermined stretch and terminates in a point 4 (3) after a very slight flare.

The insulating joint in accordance with the present invention is further provided with a sleeve 6 which is composed of a rigid, insulating material resistant to the most elevated mechanical stress but nevertheless capable of withstanding breakage during its slight and permanent deformation, so as to have a stability under the compression needed to block the joint. The sleeve 6 has an external surface which is formed to fit forcefully and perfectly with the internal surface of the first stretch of the end portion 4 of the tubular part 3, and an internal surface which is formed to fit forcefully and perfectly with the external surface of the second stretch of the end portion 2 of the tubular part 1. The sleeve terminates in an appendix 6 (1) which has an internal diameter more or less equal to the internal diameter of the tubular parts 1 and 3. The appendix 6 (1) is provided with a supporting surface 6 (2) which houses the terminal edge 2 (3) of the second stretch of the end portion 2 of the tubular part 1.

Furthermore, the insulating joint is provided with another sleeve 7 which is also composed of an insulating material. It can be the same as the material of the sleeve 6. The sleeve 7 is shaped so that its internal surface fits forcefully and perfectly with the external surface of the first stretch of the end portion 2 of the tubular part 1 and also with a short stretch of its main portion. The external surface of the sleeve 7 is parallel to its internal surface, and the sleeve thickness equal to the sleeve thickness of the sleeve 6.

Finally the insulating joint in accordance with the present invention has an insulating sealing, elastomeric gasket ring 8 of a O-ring type or any other suitable shape. The ring 8 has an internal diameter which is equal to the maximum external diameter of the end portion 2 of the tubular part 1 in the point 2 (2). Its external diameter is equal to the maximum internal diameter of the end portion 4 of the tubular part 3 in the point 4 (2).

For assembling the insulating joint for metal pipelines in accordance with the present invention, the insulating sleeve 6 is rammed into the end portion 4 of the tubular part 3. Then end portion 2 of the tubular part 1 with the gasket ring 8 and the insulating sleeve 7 positioned thereon is inserted into the end portion 4 of the tubular part 3. Finally, the second cylindrical stretch of the end portion 4 extending between the point 4 (2) and 4 (3) is plastically deformed obtaining a conformed portion 9 which is identified in FIG. 1 and runs parallel to the portion 2 of the tubular part 1.

During the assembling of the inventive insulating joint, some or all of the following conditions are to be considered.

The two insulating sleeves 6 and 7 are forcefully lodged in their respective seats, whether or not their surfaces are wet with a suitable hot or cold glue for their perfect adhesion to the opposing metal surfaces after plasticaly pressing the end portion 4 of the tubular part 3. Already in anticipation to the plastic pressing of the end portion 4, the gasket 8 is strongly compressed with the forcing of the sleeve 7 into its seat between the end portions 2 and 4. The metal surfaces in contact with the surfaces of the sleeves 6 and 7 are sand blasted. The internal surfaces of one or two tubular parts are lined with hot or cold polymerizing insulating paint or powder. Simultaneously or subsequently to the pressing of the stretch of the end portion 4 to obtain the closing and blocking of the joint as indicated in FIG. 1, the entire surface 9 is forcefully compressed longitudinally and radially so as to insure maximum compactness of the insulating joint. The deformation of dilated end portions of the two tubular parts is such that when the joint has been closed and blocked, the external diameter of the end portion 2 in the point 2 (2) is greater than the internal diameter of the end portion 4 in the point 4 (3).

The free ends of the metal tubular parts 1 and 3 can be either provided with a flange or with a bevel or male or female threading independently from each other so as to be fixed onto the pipeline at the location of insertion of the joint. The fixation can h=performed by welding, bolting, screwing, etc.

FIG. 3 shows another embodiment of the insulating joint in accordance with the present invention. In this joint two sealing gaskets 8 (1) and 8 (2) are provided and a ring 10 is located between them. The ring 10 preferably has a rectangular cross-section and is composed of a rigid, insulating material which can be similar to the material of the sleeves 6 and 7.

The sealing gaskets 8, 8 (1) and 8 (2) can be composed for example of nitril rubber. The sleeves 6 and 7 and the ring 10 can be composed for example of polycarbonate, thermoplastic amorphus.

It will be understood that each of the elements described above, or two or more together, may also find a useful application in other types of constructions differing from the types described above.

While the invention has been illustrated and described as embodied in an insulating joint for metal pipelines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An insulating joint for pipelines, comprising two metal tubular parts having similarly dilated end portions, the dilated end portion of one of the two metal tubular parts being located within the dilated end portion of the other of the two metal tubular parts and extending substantially parallel to the dilated end portion of the other of the two metal tubular parts in a radially spaced relationship relative thereto to form a gap therebetween; two sleeves composed of an insulating material, having a cross-section substantially similar to a cross-section of said dilated end portions and located in said gap one after the other in a longitudinal direction with each sleeve engaging said dilated end portions of said two metal tubular parts, said two sleeves having longitudinally spaced facing end surfaces, respectively, forming a longitudinal gap therebetween; and a gasket located in said longitudinal gap and compressed between said two facing end surfaces of said two sleeves.

2. An insulating joint as defined in claim 1, wherein said dilated end portions of said metal tubular parts have an elliptical cross-section.

3. An insulating joint as defined in claim 1, wherein said gap between said dilated end portions of said metal tubular parts is equal to substantially a few millimeters.

4. An insulating joint as defined in claim 1, wherein said sleeves are composed of a rigid and at the same time slightly resistant insulating material.

5. An insulating joint as defined in claim 1, wherein said sleeves located in said gap have substantially the same length.

6. An insulating joint as defined in claim 1, wherein said gasket located between said two sleeves is formed as an O-ring.

7. An insulating joint as defined in claim 1, wherein said gasket located between said two sleeves is composed of an elastomeric material.

8. An insulating joint as defined in claim 1, wherein at least one of said insulating sleeves is glued to the respective one of said dilated end portions of said tubular parts.

9. An insulating joint as defined in claim 1, wherein said sleeves are glued respectively to said dilated end portions of said metal tubular parts.

10. An insulating joint as defined in claim 1, wherein said dilated portions of said metal tubular parts have metal surfaces which are in contact with said insulating sleeves, at least some of said metal surfaces are sand blasted.

11. An insulating joint as defined in claim 1, wherein said dilated end portions of said metal tubular parts have metal surfaces which are in contact with said insulating sleeves, at least some of said metal surfaces are lined with insulating paint.

12. An insulating joint as defined in claim 1, wherein said two metal tubular parts are strongly compressed in a longitudinal direction and in a transverse direction against said two sleeves.

13. An insulating joint as defined in claim 1, wherein said metal tubular parts have end sections arranged to be connected with pipelines to be isolated.

14. An insulating joint as defined in claim 1, wherein the dilated end portion of the one metal tubular part is located within the dilated end portion of the other metal tubular part in a dislodge-preventing relationship.

* * * * *